United States Patent Office 3,492,880
Patented Feb. 3, 1970

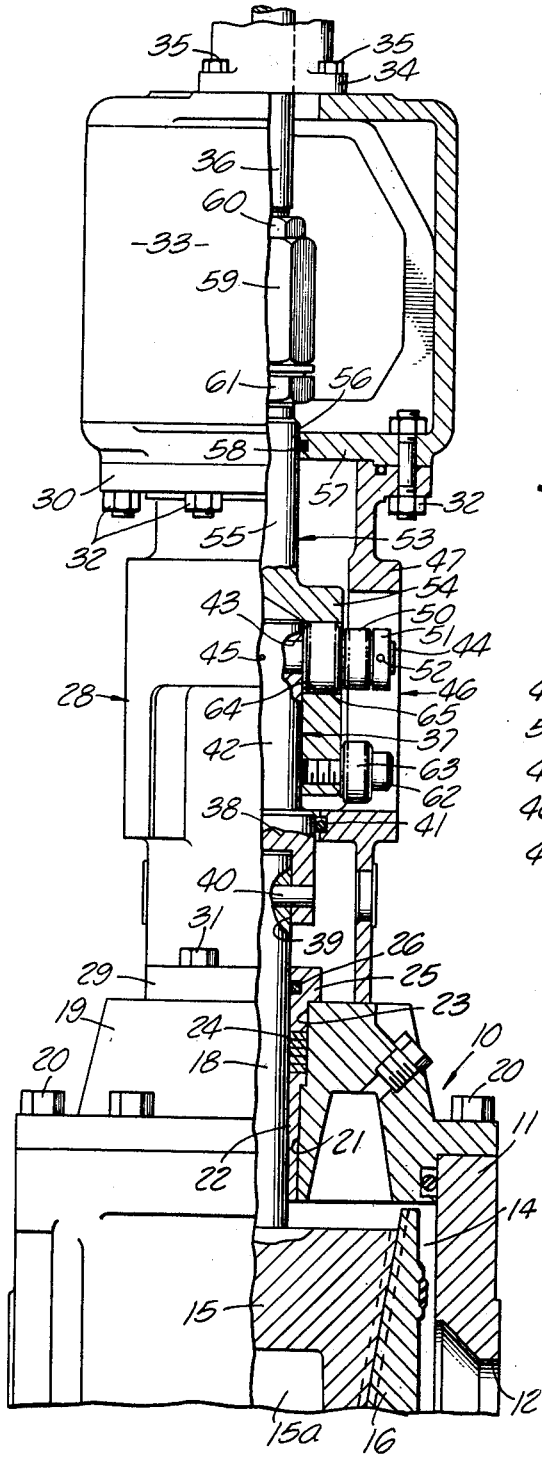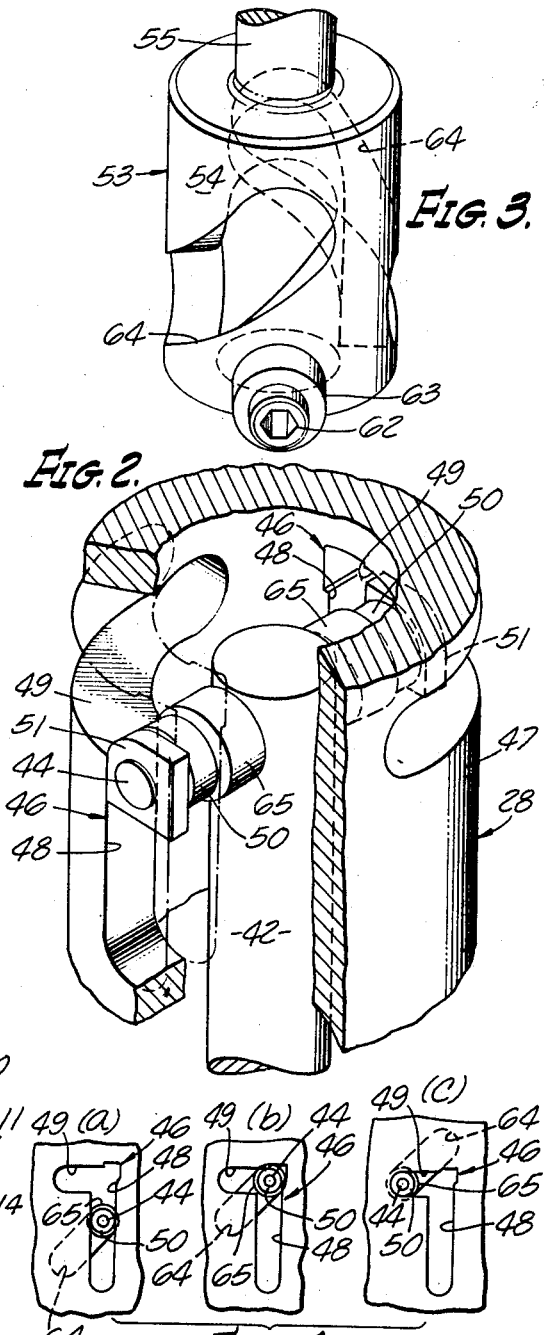
Fig. 1. Fig. 2. Fig. 3. Fig. 4.
WILLIAM M. PEARSON
INVENTOR.
WHANN & McMANIGAL
Attorneys for Applicant

3,492,880
VALVE CONTROL AND ACTUATING MECHANISM
William M. Pearson, Long Beach, Calif., assignor to General Valve Company, Inc., Long Beach, Calif., a corporation of California
Filed May 10, 1967, Ser. No. 637,489
Int. Cl. F16h 25/12, 25/16
U.S. Cl. 74—57                                 4 Claims

ABSTRACT OF THE DISCLOSURE

Control and actuating mechanism for valves of the plug type in which a tapered plug is raised to unseat associated slips and then rotated to a valve opened position, and vice versa to a closed position, which comprises an axially and rotatably movable rod member connected for unitary movement with the valve plug and having at least one radial projection, a sleeve that surrounds the rod member and is supported for axial movements, this sleeve having at least one inclined camming slot through which the radial projection extends, and a stationary housing outwardly of the sleeve having at least one inverted L-shaped guide slot, with legs in 90° relation, through which the radial projection also extends, so that the edges of the slots will cooperate upon axial movement of the sleeve to act on the radial projection to impart movements thereto corresponding to the movements required of the valve plug during valve opening and valve closing operations.

Background of the invention

This invention relates generally to valves and valve operating mechanisms.

Heretofore, certain types of plug valves have been available wherein a valve body was provided with a pair of coaxial ports which were connected to incoming and outgoing fluid lines for the movement of fluid under pressure therethrough. In these known constructions, there is a part that is adapted to rotate, and is arranged with wedges or slips which can be moved inwardly to permit rotation of the plug, and outwardly against the edges of the valve ports to provide a fluid-tight seal against the fluid in the ports. In order to effect the inward and outward movements of the wedges or slips, the plug is moved longitudinally.

Various mechanisms have been used to operate valves of this character, but in the main these mechanisms were not entirely satisfactory for the reasons that the means for accomplishing the required longitudinal and rotational movements of the valve plug were of such character that in order to obtain the required rotational movement, an accompanying additional longitudinal movement was required. That is to say, there was no clearly defined point of transition between the longitudinal movement and the rotational movement. It was therefore necessary and expensive to design a special valve structure, since a standardized valve structure could not be utilized.

In the herein disclosed and described invention, the above noted as well as other problems have been solved by providing a control and actuating mechanism, wherein discrete longitudinal and rotational movements are obtained. Accordingly, the mechanism of the present invention can be utilized with a valve of standard construction which can be more economically produced than the special valves. Also, it is possible to incorporate the mechanism into a standard unit attachment which can be separately produced and sold for use on the standard valve constructions.

Summary of the invention

The present invention relates to a valve control and actuating mechanism, and more particularly to such mechanisms as have utility in connection with valves of the plug type, it being understood however that the utility is not confined thereto.

Having the inherent disadvantages of prior structures in mind, it is one important object of the present invention to provide an improved valve control and actuating mechanism for use with plug type valves, and which does not necessitate a special valve structure, but which may be utilized with valves of standard construction.

It is a further object of the invention to provide a valve operating mechanism that will effectively rotate the valve plug and move it axially in separate discrete movements in order to effect inward and outward movements of the slips or wedges of the valve.

Still another object of the invention is to provide mechanism of this character which can be constructed and sold as a separate article of manufacture for attachment as a unit to plug valves of standard construction, and which may be utilized with different types of power supply means.

The characteristics and advantages of the invention are further sufficiently referred to in connection with the following detailed description of the accompanying drawings, which represent one embodiment. After considering this example, skilled persons will understand that many variations may be made without departing from the principles disclosed, and I contemplate the employment of any structures, arrangements or modes of operation that are properly within the scope of the appended claims.

Brief description of the drawings

Referring to the accompanying drawings, which are for illustrative purposes only:

FIG. 1 is a fragmentary side elevational view of a valve and operating mechanism therefor embodying the present invention, portions being broken away to disclose details of interior construction thereof;

FIG. 2 is a fragmentary perspective view of a portion of the intermediate housing, showing details of the guide slot therein;

FIG. 3 is a fragmentary perspective view of the associated inner cam sleeve, showing the arrangement of the camming slots therein; and FIGS. 4a, b, and c are successively diagrammatically illustrative of the variation of the mutual relationship of the slots in controlling movement of the radial projection during actuation of the valve.

Description of the preferred embodiment

Referring more particularly to the drawings, the invention is illustrated in FIG. 1 as being applied to a valve, as generally indicated at 10, which comprises a hollow valve body 11 with aligned opposed ports 12 therein communicating with the hollow interior or chamber 14.

Within the chamber 14, there is operably disposed a plug 15. This plug is tapered and provided with a pair of associated arcuate and tapered wedge elements or slips 16 operably secured to the plug.

Plug 15 has a valve stem 18 secured to the upper end thereof, and longitudinal and rotative movements of this valve stem will effect corresponding movements of the plug. More specifically, if the valve is in the closed position the slips are positioned to close the ports 12. To open the valve, plug 15 is moved upwardly whereupon the wedges or slips 16 are moved inwardly with no upward movement, so as to clear the valve seat. Thereafter, the plug 15 is rotated to bring the diametrical passage 15a of the plug into alignment with the inlet and outlet ports. To close the valve, the plug is rotated 90° and then moved downwardly to thereby force the wedges or slips outwardly to close the inlet and outlet ports.

The foregoing is a brief description of the construction and operation of a plug type valve controlled by the present valve operating mechanism. One example of such a plug valve is disclosed in United States Letters Patent No. 2,596,075, issued May 6, 1952, for a valve. The present mechanism may, of course, be used to operate other types of valves or other mechanisms.

The upper end of the body 11 is provided with a bonnet 19 which is secured to said body by any suitable means such as the screws or bolts 20. Bonnet 19 has an axial opening 21 therethrough in which is disposed a bushing 22. The opening through the bonnet is enlarged at 23 and within this enlarged portion or part of the passage through the bonnet is a packing 24 of any suitable character, the type of packing shown being of the Chevron type. In the upper end of the enlarged portion 23 of the opening or passage through the bonnet is a packing gland 25 of any well known type. The valve stem or rod 18 of the plug 15 extends upwardly through the bushing 22, packing 24 and packing gland 25, the latter having an internal groove in which is disposed a seal 26 engageable with the rod 18.

Above the bonnet is a tubular intermediate housing 28 for the valve control and actuating unit which constitutes a primary feature of the present invention and embodies a unique mechanism for auxiliary moving and rotating the valve plug 15 to open and close the valve. The specific details and operation of this unit will hereinafter be more fully described. The housing 28 has lower and upper connection flanges 29 and 30 respectively, the lower flange 29 being secured to the bonnet by suitable means such as the screws 31. The upper flange 30 is secured as by suitable screws or bolts 32 to the bottom end of an upper housing 33 which also serves as a support for appropriate associated power means, such as hydraulic, pneumatic, manual or other form. Such power means may be enclosed in an appropriate housing (not shown), and would usually be attached at the top of the upper housing 33 by means of a suitable attaching flange 34 and securing screws 35. Whatever type of power means are utilized, it will embody an axially reciprocably movable power delivery member, such as a rod 36 having a connecting end positioned in the housing 33.

While the valve control and actuating unit as contained in the intermediate housing 28 is shown in combination with the valve structure, it will be understood that the unit is adapted to be manufactured as a separate device which can be applied to standard valves of the type described herein. The control and actuating mechanism is disclosed as comprising an operating member 37 of cylindrical construction which is mounted in axial alignment with the valve stem 18 and coupled thereto so as to in effect provide an extension to the valve stem. The operating member 37 has an enlarged lower end 38 provided with an end opening socket 39 which is adapted to receive the upper end of the valve stem 18. The coupled parts are retained by means of a coupling pin 40 which extends through apertures in the head and valve stem. The end 38 is peripherally sealed by a surrounding seal member 41 which is supported in an adjacent wall of the housing. The coupling end of the member 37 merges into an upwardly extending stem 42.

At its uppermost end, the stem 42 is provided with a transversely extending bore 43 within which a radial projection in the form of a trunnion pin 44 is fixedly retained by means of a pin 45. As thus mounted, the ends of the trunnion pin project outwardly on opposite sides of the stem. Each outer end of the pin 44 is arranged to extend into an inverted L-shaped slot 46 which is formed in a generally cylindrical surrounding wall 47 of the intermediate housing 28. This slot has one leg 48 which extends axially of the housing, and an upper leg 49 which follows the circumference of the surrounding wall and in general extends in right angle relation to the leg 48. The slot 46 thus guidingly controls the movement of the pin 44 therein, and in order to reduce friction, the pin carries an anti-friction bearing 50, this bearing having its inner race secured to the pin and its outer race in roller engagement with the edges of the slot 46. As thus arranged, the longitudinal movement of the plug 15 will occur during movement of the projection in the leg 48 of the slot, while rotative movement of the plug will take place during movement of the projection in the leg 49 of the slot.

In order that the control and actuating mechanism unit may be utilized with a standard valve, it is important that a very definite point of transition be established in changing from longitudinal to rotational movement, and vice versa. Means have therefore been provided to prevent shifting of the anti-friction bearing 50 until the full limit of travel has been reached in the leg of the slot from which the transition is being made to the other leg of the slot. For such purpose, the outer end of the trunnion pin 44 is provided with a locking block 51 which is affixed to the trunnion pin by means of an anchor pin 52. It will be observed that the block 51 also rides in the slot 46. Since the locking block 51 is of generally rectangular configuration, with square corners which prevent the bearing 50 from creeping around the inside corner of the slot until the full travel brings the locking block into alignment axially of the slot into which the bearing 50 is being moved.

Movement of the pin 44 is accomplished by means of a camming element, as generally indicated at 53. As shown in FIGS. 1 and 3, this camming element is constructed with a cam sleeve 54 at one end, this sleeve being adapted to telescopically surround the stem 42 in sliding engagement therewith. The cam sleeve merges into a stem 55 which is in axial alignment with the stem 42. The stem 55 extends upwardly through an opening 56 in a bottom wall 57 of the housing 33, the stem being sealed in the wall 57 by means of a circumferentially extending seal 58. The stem 55 and power delivery rod 36 of the power unit are in axial alignment and have threaded ends which are secured together by means of a suitable coupling 59 and associated upper and lower jamb nuts 60 and 61 respectively. Thus, axial movements of the power delivery rod 36 will be imparted to the cam sleeve 54.

Rotation of the cam sleeve about its axis is prevented by means of a guide pin 62 supported at the lowermost end of the cam sleeve, as seen in FIG. 1, and with its outermost end extending into the leg 48 of the slot 46 below the pin 44. The guide pin 62 is also provided with an anti-friction bearing 63.

Referring to FIG. 3, the cam sleeve is provided with spirally extending diametrical cam slots 64—64 through which the projecting ends of the trunnion pin 44 extend, the projecting ends being respectively provided with an anti-friction bearing 65 for movement in the associated camming slot. The camming slots 64—64 are inclined at an angle to the cam sleeve axis. Thus, as the cam sleeve is axially moved, the camming slots operate to move the projecting ends of the trunnion pin 44 in guided movements through the legs of the L-shaped slot 46 so as to raise the plug 15 and thereafter rotate it, and vice versa.

Referring to FIG. 4, the operation has been diagrammatically illustrated. In FIG. 4a, the pin 44 is at the lowermost end of leg 48 of the slot 46. This is the closed position of the valve, and the camming slot 64 will be at its lowest axial position. Upon energization of the power unit, the power delivery rod will act to raise the cam sleeve 54. During this raising movement, the pin 44 will be carried to the upper limit of the slot leg 48, as shown in FIG. 4b. At this position, the wedges or slips 16 will have been moved inwardly so as to clear the valve seats associated therewith.

Further upward movement of the cam sleeve will cause the camming slot 64 to cam the trunnion pin 44 in a rotative movement through the right angled leg 49 of the guide slot 46. This position of the trunnion pin 44 corresponds to the open position of the valve in which the diametrical passage 15a is in alignment with the inlet and outlet ports. Closing movements of the valve are in reverse order and are accomplished by moving the power delivery rod 36 in a downward direction, as viewed in FIG. 1.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific forms shown or uses mentioned except as defined in the accompanying claims, wherein various portions have been separated for clarity of reading and not for emphasis.

I claim:

1. Mechanism for controlling and actuating a valve through a part supported for longitudinal and rotative movements, comprising:
   (a) a member having at least one radial projection thereon, said member being adapted for fixed coupling connection with said valve part for unitary movement therewith;
   (b) an element around said member supported for movement axially of said member, said element having at least one slot therein through which said radial projection extends;
   (c) stationary means outwardly of said element having at least one slot therein through which said radial projection also extends, said slot having end connected leg portions, one of said leg portions extending axially of said element and the other leg portion extending circumferentially of said element, the edges of said slots cooperating upon axial movement of said element to act on said radial projection to impart guided movements thereto in said leg portions, and wherein transition of the movements of the radial projection at the connected ends of the leg portions will be directly from an axial movement to a rotational movement, and vice versa; and
   (d) a projection carried by said element extending into said axially extending leg portion of the slot for guided movement therein.

2. Mechanism for controlling and actuating a valve through a part supported for longitudinal and rotative movements, comprising:
   (a) a member having at least one radial projection thereon, said member being adapted for fixed coupling connection with said valve part for unitary movement therewith;
   (b) an element around said member supported for movement axially of said member, said element having at least one slot therein through which said radial projection extends;
   (c) stationary means outwardly of said element having at least one inverted L-shaped slot therein through which said radial projection also extends, said slot having end connected leg portions in right angle relation, one of said leg portions extending axially of said element and the other leg portion extending circumferentially of said element, the edges of said slots cooperating upon axial movement of said element to act on said radial projection to impart guided movements thereto in said leg portions, and wherein transition of the movements of the radial projection at the connected ends of the leg portions will be directly from an axial movement to a rotational movement, and vice versa; and
   (d) means operative at the junction of the legs of the L-shaped slot for opposing movement of said projection from one slot leg into the other slot leg until the projection is at a coincident point common to the axes of said legs.

3. Mechanism according to claim 2, wherein said means includes a locking member carried by said projection.

4. Mechanism according to claim 3, wherein the locking member comprises a substantially rectangular block having movement in the L-shaped slot.

References Cited

UNITED STATES PATENTS

| | | | |
|---|---|---|---|
| 3,046,802 | 7/1962 | Cupedo | 74—110 |
| 3,078,065 | 2/1963 | Vickery | 251—58 |

FRED C. MATTERN, Jr., Primary Examiner

W. S. RATLIFF, Jr., Assistant Examiner

U.S. Cl. X.R.

251—58